Feb. 1, 1944.  E. RÜDIGER  2,340,565
LOCKING DEVICE FOR THREADED PIPE JOINTS
Filed Aug. 11, 1941
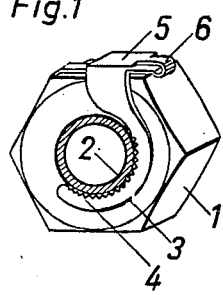
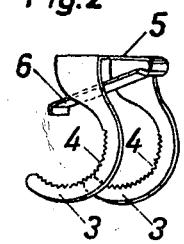
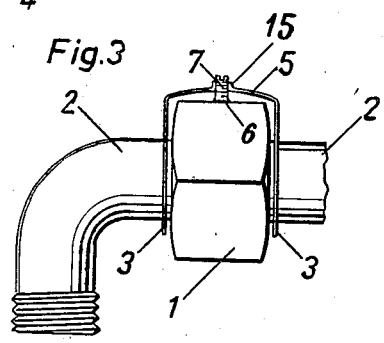
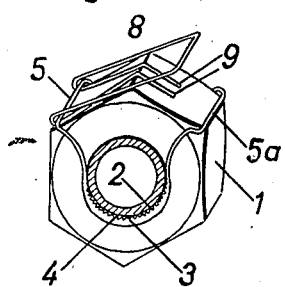
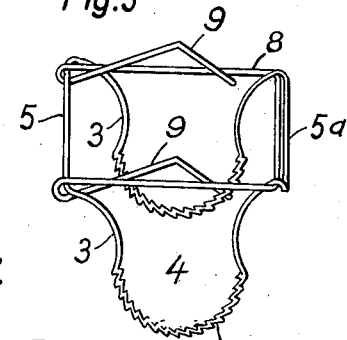
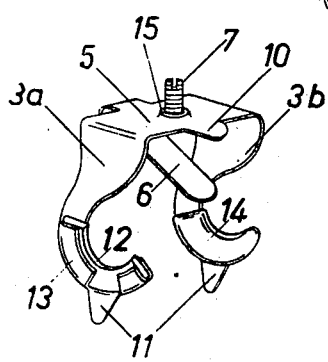
Inventor
Ernst Rüdiger
By
Attorney Patented Feb. 1, 1944

2,340,565

UNITED STATES PATENT OFFICE 2,340,565

LOCKING DEVICE FOR THREADED PIPE JOINTS

Ernst Rüdiger, Berlin, Germany; vested in the Alien Property Custodian

Application August 11, 1941, Serial No. 406,374 In Germany November 15, 1940

9 Claims. (Cl. 151—2)

The invention relates to a locking device for threaded pipe joints, and its object is to secure the cap nut connecting the ends of the pipes in every position of the cap nut. Another object of the invention is to enable the locking device to be easily fixed at difficultly accessible places and to be always used again after it has been taken off.

Accordingly, the locking device provided by the invention substantially consists of two hooks surrounding the ends of the pipes at the sides of the cap nut, a bridge passing over the cap nut and connecting the hooks, and means for pressing the hooks against the ends of the pipes to be connected.

Various constructional forms of the device according to the invention are illustrated by way of example in the accompanying drawing, in which like reference numerals indicate like parts, and in which:

Fig. 1 is a perspective view of a pipe connection with a cap nut and a locking device;

Fig. 2 is a perspective view of the locking device;

Fig. 3 is a side view of a pipe bend connection with a locking device;

Fig. 4 is a perspective view of a pipe connection with a cap nut and a locking device made of wire;

Fig. 5 is a perspective view of a locking device according to Fig. 4; and

Fig. 6 is a perspective view of another constructional form of a locking device.

Two pipe ends 2—2 are connected in usual manner by a cap nut 1. In order to perfectly secure this cap nut in every position, a novel locking device is provided. This locking device consists, according to Figs. 1 to 3 and Fig. 6, of a stamped piece of sheet metal bent in such a manner that two hooks 3 are formed perpendicular to a bridge 5, the length of the bridge 5 exceeding somewhat the height of the cap nut 1, and the bridge 5 being adapted to have a free position over the circumference of the cap nut. This locking device is simply pushed over the cap nut 1 so that the hooks 3 surround the ends 2—2 of the pipes at the sides of the cap nut 1. In order to be able to tightly press the hooks 3 against the walls of the pipes and thereby to secure the cap nut 1 in its position, an elastic blade 6 is formed, which presses against the cap nut 1 below the bridge 5 and thereby secures the hooks 3 to the ends of the pipes. Instead of the blade 6, there may be provided in the bridge 5 a tap hole strengthened by a collar 15, through which a headless screw 7 or the like may be screwed against the circumference of the cap nut 1, whereby the bridge 5 is lifted and the hooks 3 are pressed against the walls of the ends 2 of the pipes. But the screw 7 may be provided in addition to the blade 6, in which case the screw 7, when being tightened, presses via the blade 6 against the cap nut 1 (Figs. 3 and 6).

In order to prevent the hooks 3 from slipping, the inner sides of the hooks 3 are provided with teeth 4 (Figs. 1 and 2) or with a rough surface. But the ends of the hooks may also be provided with a rough lining causing a high friction, such as fibre, asbestos, caoutchouc, or synthetic caoutchouc, as for example in Fig. 6. According to this Fig. 6, one of the hooks 3a is provided with a flange 13 produced by the cutting 11, a strip 12 of fibre, asbestos, or some other elastic material being inserted in the flanged part so as to project over the inner edge of the hook 3a and to bear against the wall of the pipe. In another constructional example, the hook 3b in Fig. 6 is provided with a rubber coating, particularly of synthetic rubber, which is extremely suitable because it is not affected by oil, petrol and heat.

The locking device described above may be easily removed by pressing down and pushing back the bridge 5, after having loosened the screw 7, if the latter is used. The removal of the locking device may be facilitated by providing the bridge 5 according to Fig. 6 with a flange extension 10 on the open side of the hooks so that, by pressing on this extension 10, the hooks 3 are tipped and may be removed.

Another constructional example is shown in Figs. 4 and 5, where the locking device consists of two hook bows 3 made of wire, which are bridged over at both ends by bridges 5 and 5a. A locking bow 8 engages the bridge 5 and is provided with two elastic angular legs 9 bearing against the circumference of the cap nut and tending to press the bow 8 in outward direction. This locking device is operated by pushing the two hook bows 3 at the sides of the cap nut 1 towards the two ends 2—2 of the pipes and then pressing down the locking bow 8 until its free end snaps over the bridge 5a. When pressing down the locking bow 8, it is advantageous to grip the bow 8 together with the bridge 5a with flat pliers, by means of which these parts are drawn together. Also in this construction, the inner side of the hook bows 3 may be provided, for example after pressing flat the hooks 3 (Fig. 4), with teeth 4, or the hooks 3 may be given a zigzag shape, as shown in Fig. 5. In this case there may also be provided other coatings with high friction on the hook portions adjoining the pipe walls, which coatings, on the one hand, ensure a good adhesion and, on the other hand, prevent the pipe ends from being damaged, if they consist of a soft material, for example aluminium.

What I claim is:

1. A locking device for threaded pipe joints, consisting of two hooks surrounding the pipe ends to be connected at the sides of the cap nut, a bridge connecting the hooks above the cap nut, and means for pressing the hooks against the pipe ends to be connected.

2. A locking device for threaded pipe joints as claimed in claim 1, in which the means for pressing the hooks against the pipe ends to be connected consist of a screw passing through a tap hole in the bridge and capable of being screwed against the circumferance of the cap nut.

3. A locking device for threaded pipe joints as claimed in claim 1, in which the means for pressing the hooks against the pipe ends to be connected consist of an elastic blade engaging the bridge and pressing below the bridge against the circumference of the cap nut.

4. A locking device for threaded pipe joints as claimed in claim 1, in which the means for pressing the hooks against the pipe ends to be connected consist of an elastic blade and a screw capable of being screwed through a tap hole in the bridge and pressing the blade against the circumference of the cap nut.

5. A locking device for threaded pipe joints as claimed in claim 1, in which the bridge connecting the hooks is provided with a flange extension on the open side of the hooks.

6. A locking device for threaded pipe joints as claimed in claim 1, in which the hooks are provided with teeth on the side adjoining the wall of the pipe.

7. A locking device for threaded pipe joints as claimed in claim 1, in which the hooks are provided on the side adjoining the wall of the pipe with an elastic and highly frictional coating.

8. A locking device for threaded pipe joints as claimed in claim 1, in which the hooks are provided with a rough surface on the side adjoining the wall of the pipe.

9. A locking device for threaded pipe joints consisting of two hooked bows made of wire surrounding the pipe ends to be connected at the sides of the cap nut, and being connected at the ends above the circumference of the cap nut by bridges, and a locking bow, being elastic towards the circumference of the cap nut, being hinged to one of the bridges of the hooks, and engaging the other bridge of the hooks with the free end of the bow.

ERNST RÜDIGER.